Feb. 28, 1950 M. LEACH 2,499,273
BELT SHIFTER
Filed Dec. 29, 1945
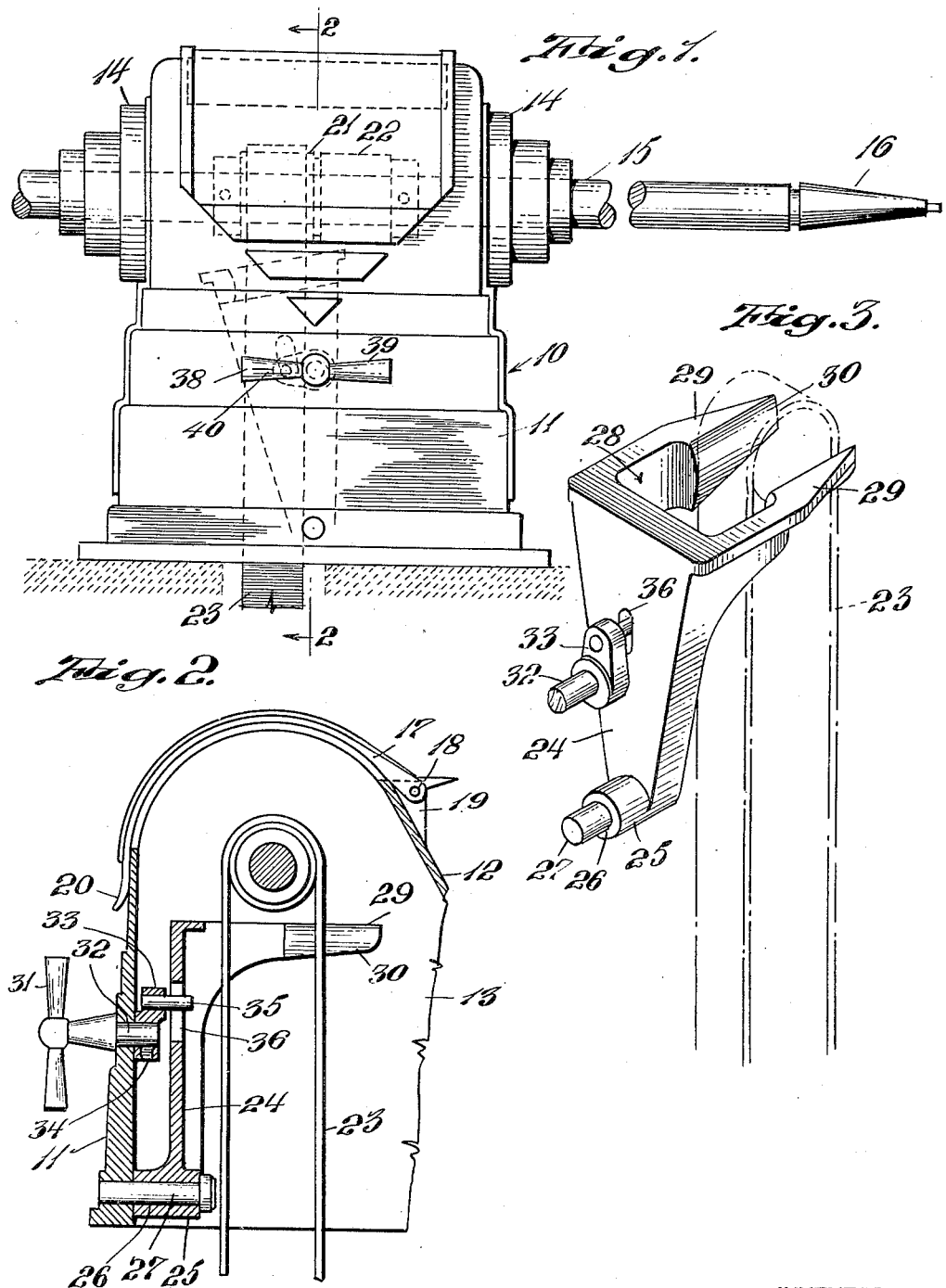
INVENTOR
Max Leach
BY Barlow & Barlow
ATTORNEYS Patented Feb. 28, 1950

2,499,273

UNITED STATES PATENT OFFICE 2,499,273

BELT SHIFTER

Max Leach, Providence, R. I., assignor to H. Leach Machinery Co., a corporation of Rhode Island Application December 29, 1945, Serial No. 638,004

5 Claims. (Cl. 74—242)

1

This invention relates to a belt shifter particularly adapted to be used in combination with a polishing lathe.

Polishing lathes of the bench type usually comprise a bearing support in which is journaled a spindle to which is attached the various devices employed for polishing and like purposes. The support rests on a table, bench, or the like. When the spindle is belt driven it is usually provided with tight and loose pulleys mounted thereon and about which passes an endless belt for transmitting rotary motion from a suitable power source. A belt shifter is usually furnished as a separate device and is attachable to the table.

One object of this invention is the provision of a polishing lathe with a belt shifter formed as an integral part of the lathe.

Another object of the invention is the provision of a belt shifter which will be operable from a location in front of the lathe.

Another object of the invention is the provision of a belt shifter wholly enclosed within the spindle housing support.

Another object of the invention is the provision of a belt shifter wholly enclosed within the spindle housing support with means on the outside of the housing support to indicate the relative positions of the belt shifter.

Another object of the invention is the provision of a belt shifter wherein the limit of movement thereof in each direction will be controlled without the use of stops or adjustments.

With these and other objects in view, the invention consists of certain novel features of construction, as will be more fully described and particularly pointed out in the appended claims.

In the accompanying drawings:

Fig. 1 is a front elevational view of a polishing lathe embodying my invention;

Fig. 2 is a sectional view taken substantially along lines 2—2 of Fig. 1;

Fig. 3 is a perspective view of the belt shifter and the means for swinging the same about its pivot.

In carrying out my invention, I provide a lever having a bifurcated end portion providing arms between which the belt passes. This lever is pivotally mounted on the front wall of the spindle housing. In order to swing the lever so as to move the belt from one pulley to the other, I provide a crank arm which I pivotally mount on the front wall and extend the pivot thereof through the wall and attach a handle thereto to manually rock the crank.

2

Referring to the drawings for a more detailed description of the invention, 10 designates generally a housing bearing support having front, rear, and side walls, 11, 12, and 13 respectively. The side walls mount bearings 14 in which there is suitably journaled a spindle 15. The spindle extends beyond the side walls of the housing and has the end portions 16 thereof formed so as to receive a polishing wheel or like device. A closure 17 is hinged as at 18 on a boss 19 extending from the rear wall 12. The front portion of this cover is provided with a lip 20 which is engageable to swing the cover about the hinge for access to the parts within the housing.

The spindle is belt driven and is provided with tight and loose pulleys 21, 22 suitably mounted on the spindle at a location to be enclosed within the housing 10. An endless belt 23 is trained about the pulleys and extends from a drive pulley beneath the housing (not shown).

In order to shift or move the belt from one pulley to the other, I provide a lever 24 having a boss 25 apertured as at 26 to receive a pivot pin 27, which extends from the wall 11. The upper end portion of the lever is bifurcated as at 28 providing similar spaced arms 29. These arms extend generally at right angles from the body of the lever in a direction toward and beyond the belt which is trained over the pulleys. The belt 23 passes between these arms and is moved from one pulley to the other thereby. These arms are provided with a curved surface 30 so as to provide a point contact with the belt when moving the same from one pulley to another. To swing the lever 24 about the pivot 27 I provide a manually operable handle 31 which has a shaft 32 extending through the wall 11 in rotative relation therewith. I mount on this shaft a crank 33 by means of a screw 34. This crank has an extension here shown in the form of a pin 35 which is received in an elongated slot 36 provided in the lever 24.

The handle 31 is manually turned and has opposite arms 38, 39. When mounting the crank 33 on the shaft 32, the arms 38, 39 are positioned to be horizontal and the crank so located on the shaft 32 as to have the axis of the pin 35 intersect and axes of the arms 38, 39. This will position the pin 35 at the limit of throw of the crank 33 which will also be the limit of swing of lever 24 in one direction. An indicating mark which may take the form of an arrow 40 is placed on one of the arms of the handle so that when the arms are in a horizontal position the relative position of the belt may be determined prior to placing the power source in action.

It will be apparent that as the handle is rotated in one direction, the crank 33 will be rotated with the shaft 32 in the same direction and through the pin 35 will swing the lever about the pivot pin 27 to move the belt from one pulley to the other as the case may be.

I claim:

1. A belt shifter comprising a bifurcated pivoted lever providing spaced arms between which the belt passes, said lever having an elongated opening extending longitudinal thereof at a location thereon intermediate the ends thereof and means including an eccentrically mounted pin received in said opening and movable therein and operable for swinging said lever about its pivotal mounting for shifting the belt from one pulley to the other.

2. A belt shifter comprising a pivoted lever having right angularly extending spaced arms at one end thereof between which the belt passes, said lever having an elongated opening extending longitudinal thereof at a location thereon intermediate the ends thereof, and rockable means including a pin slidably received in said opening operable for swinging said lever about its pivoted mounting for shifting the belt from one pulley to the other.

3. A belt shifter comprising a bifurcated pivoted lever providing spaced arms between which the belt passes, said lever having an elongated opening extending longitudinal thereof at a location thereon intermediate the ends thereof, and a crank pivotally mounted adjacent said lever and having a pin extending therefrom received in said opening for swinging the lever about its pivoted mounting upon movement of the crank.

4. In a machine tool having an upright wall providing a support, a belt shifter having a body portion pivotally mounted at the lower end thereof to said support in spaced relation therewith, said body portion having an opening therein intermediate the ends thereof, a crank pivotally mounted to said support and extending therefrom in the space between said support and said body and having a projection thereof extending into said opening and slidably engaging the walls thereof for swinging the belt shifter about its mounting upon movement of the crank.

5. In a machine tool having an upright wall providing a support, a belt shifter having a body portion pivotally mounted at the lower end thereof to said support in spaced relation therewith, said body portion having an opening therein intermediate the ends thereof, a crank pivotally mounted to said support and extending therefrom in the space between said support and said body and having a projection thereof extending into said opening and slidably engaging the walls thereof for swinging the belt shifter about its mounting upon movement of the crank, and a handle extending on the opposite side of said support and secured to said crank for rocking the same about its mounting.

MAX LEACH.

REFERENCES CITED

The following references are of record in the file of this patent:

UNITED STATES PATENTS

| Number | Name | Date |
|---|---|---|
| 782,350 | Moore | Feb. 14, 1905 |
| 1,028,966 | Reed | June 11, 1912 |
| 1,670,139 | Cockburn | May 15, 1928 |
| 2,293,391 | Hepburn | Aug. 18, 1942 |